(12) United States Patent
Gorokhov et al.

(10) Patent No.: US 10,219,300 B2
(45) Date of Patent: Feb. 26, 2019

(54) ENHANCED CHANNEL RESERVATION FOR CO-EXISTENCE ON A SHARED COMMUNICATION MEDIUM

(71) Applicant: QUALCOMM Incorporated, San Diego, CA (US)

(72) Inventors: Alexei Gorokhov, San Diego, CA (US); Peter Gaal, San Diego, CA (US); Nachiappan Valliappan, Santa Clara, CA (US); Chirag Patel, San Diego, CA (US); Ahmed Sadek, San Diego, CA (US); Brian Banister, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 15/240,476

(22) Filed: Aug. 18, 2016

(65) Prior Publication Data

US 2017/0055291 A1 Feb. 23, 2017

Related U.S. Application Data

(60) Provisional application No. 62/207,321, filed on Aug. 19, 2015.

(51) Int. Cl.
*H04W 74/08* (2009.01)
*H04W 72/12* (2009.01)
(Continued)

(52) U.S. Cl.
CPC ......... *H04W 74/0816* (2013.01); *H04L 5/005* (2013.01); *H04L 5/14* (2013.01);
(Continued)

(58) Field of Classification Search
CPC ............. H04W 16/14; H04W 74/0808; H04W 74/0816; H04W 74/002; H04W 74/02; H04W 72/1215; H04L 5/005; H04L 5/14
See application file for complete search history.

(56) References Cited

U.S. PATENT DOCUMENTS

2014/0112289 A1* 4/2014 Kim ...................... H04W 16/14
370/329
2014/0341018 A1 11/2014 Bhushan et al.
(Continued)

OTHER PUBLICATIONS

Broadcom Corporation et al., "Robust Coexistence LAA-LTE", 3GPP TSG RAN WG1 Meeting #79, Nov. 17-21, 2014, R1-145167, pp. 1-9.
(Continued)

*Primary Examiner* — Paul H Masur
(74) *Attorney, Agent, or Firm* — Muncy, Geissler, Olds & Lowe (57) ABSTRACT

Techniques for reservation coordination on a shared communication medium are disclosed. An access point, for example, may contend for access to a communication medium, and transmit a channel reservation message in accordance with a first Radio Access Technology (RAT) to reserve the communication medium for a transmission opportunity (TXOP) duration based on the contending. The access point may then transmit, during the reserved TXOP duration, a reservation coordination signal in accordance with a second RAT to convey reservation coordination information associated with the reserved TXOP duration.

30 Claims, 7 Drawing Sheets

(51) Int. Cl.
  *H04L 5/00* (2006.01)
  *H04L 5/14* (2006.01)
  *H04W 16/14* (2009.01)
  *H04W 74/00* (2009.01)
  *H04W 84/12* (2009.01)

(52) U.S. Cl.
  CPC ....... *H04W 16/14* (2013.01); *H04W 72/1215* (2013.01); *H04W 74/002* (2013.01); *H04W 84/12* (2013.01)

(56) References Cited

U.S. PATENT DOCUMENTS

| | | | |
|---|---|---|---|
| 2015/0223075 A1 | 8/2015 | Bashar et al. | |
| 2016/0073434 A1* | 3/2016 | Zhang | H04W 74/006 370/329 |
| 2016/0088642 A1* | 3/2016 | Yang | H04W 24/08 455/451 |
| 2016/0128130 A1* | 5/2016 | Sadek | H04B 17/309 370/328 |
| 2017/0230970 A1* | 8/2017 | Kim | H04W 72/0446 |
| 2017/0257775 A1* | 9/2017 | Jiang | H04W 16/14 |
| 2018/0124611 A1* | 5/2018 | Moon | H04W 16/14 |
| 2018/0139781 A1* | 5/2018 | Park | H04W 74/0808 |

OTHER PUBLICATIONS

International Search Report and Written Opinion—PCT/US2016/047882—ISA/EPO—dated Nov. 4, 2016.

\* cited by examiner

ENHANCED CHANNEL RESERVATION FOR CO-EXISTENCE ON A SHARED COMMUNICATION MEDIUM

CROSS-REFERENCE TO RELATED APPLICATIONS

The present application claims the benefit of U.S. Provisional Application No. 62/207,321, entitled "Enhanced Channel reservation for Co-Existence on a Shared Communication Medium," filed Aug. 19, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof In one example, a communication method is disclosed. The method may include, for example, contending for access to a communication medium; transmitting a channel reservation message in accordance with a first Radio Access Technology (RAT) to reserve the communication medium for a transmission opportunity (TXOP) duration based on the contending; and transmitting, during the reserved TXOP duration, a reservation coordination signal in accordance with a second RAT to convey reservation coordination information associated with the reserved TXOP duration.

In another example, a communication apparatus is disclosed. The apparatus may include, for example, at least one processor, at least one memory coupled to the at least one processor, and at least one transceiver. The at least one processor and the at least one memory may be configured to contend for access to a communication medium. The at least one transceiver may be configured to transmit a channel reservation message in accordance with a first RAT to reserve the communication medium for a TXOP duration based on the contending, and transmit, during the reserved TXOP duration, a reservation coordination signal in accordance with a second RAT to convey reservation coordination information associated with the reserved TXOP duration.

In another example, another communication apparatus is disclosed. The apparatus may include, for example, means for contending for access to a communication medium; means for transmitting a channel reservation message in accordance with a first RAT to reserve the communication medium for a TXOP duration based on the contending; and means for transmitting, during the reserved TXOP duration, a reservation coordination signal in accordance with a second RAT to convey reservation coordination information associated with the reserved TXOP duration.

In another example, a transitory or non-transitory computer-readable medium is disclosed. The computer-readable medium may include, for example, code for contending for access to a communication medium; code for transmitting a channel reservation message in accordance with a first RAT to reserve the communication medium for a TXOP duration based on the contending; and code for transmitting, during the reserved TXOP duration, a reservation coordination signal in accordance with a second RAT to convey reservation coordination information associated with the reserved TXOP duration.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to co-existence techniques between Radio Access Technologies (RATs) operating on a shared communication medium subject to contention. To reserve the shared communication medium for one RAT (e.g., LTE), channel reservation messaging may be sent in accordance with another RAT (e.g., Wi-Fi) and supplemented with additional reservation coordination signaling sent in accordance with the RAT for which the communication medium is being reserved. The additional reservation coordination signaling may be used to communicate information to both inter-operator and intra-operator neighboring devices. The reservation coordination signaling may be configured in various ways and to communicate various types of reservation coordination information, such as an operator identifier, a remaining reservation duration, a resource reuse scheme identifier, and so on.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
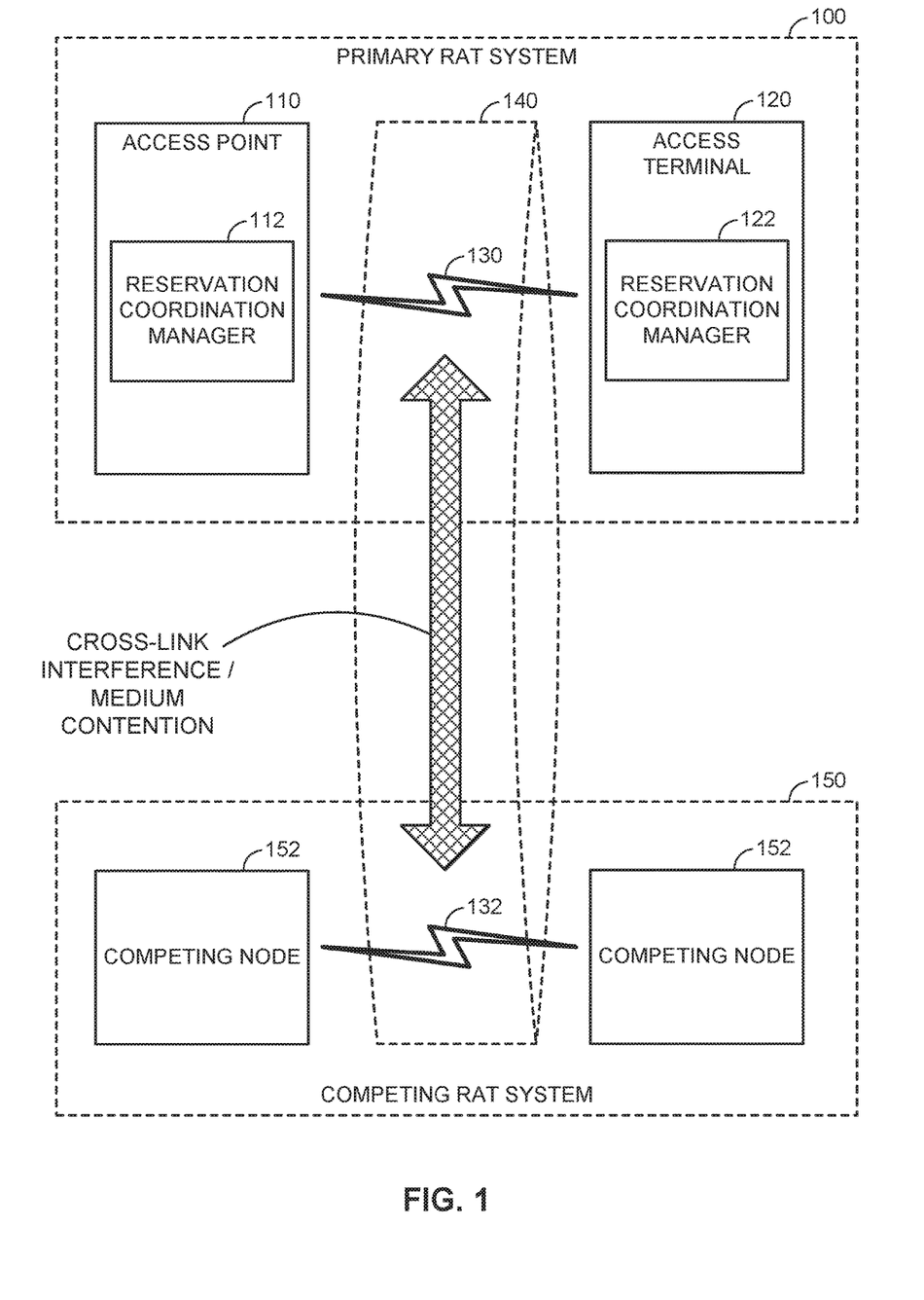
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the reservation coordination techniques discussed briefly above. For example, the access point 110 may include a reservation coordination manager 112 and the access terminal 120 may include a reservation coordination manager 122. The reservation coordination manager 112 and/or the reservation coordination manager 122 may be configured in different ways to manage reservation of the communication medium 140.

Figure 2:
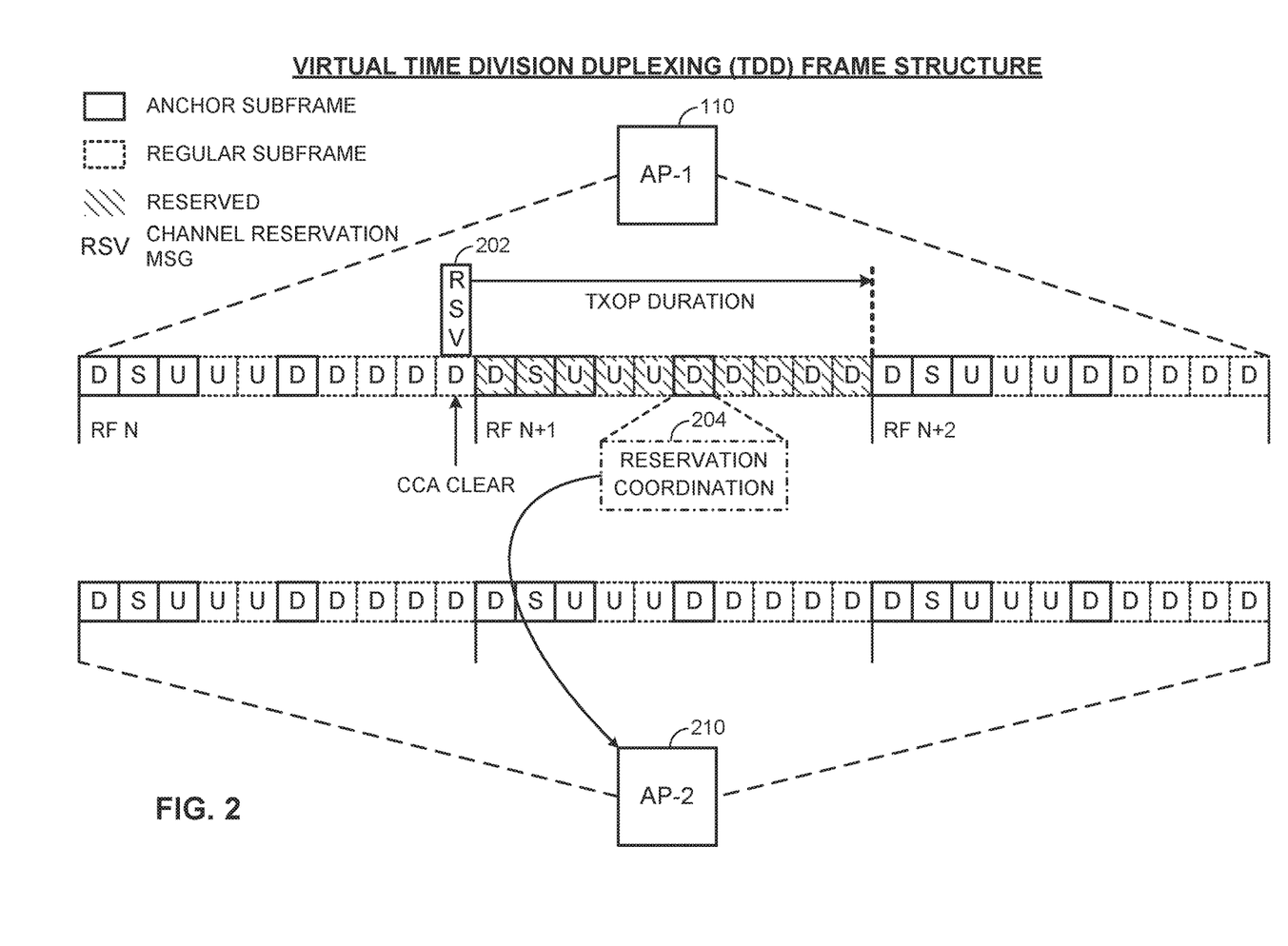
FIG. 2 illustrates an example virtual Time Division Duplexing (TDD) frame structure.

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150. In this example, the access point 110 is operating in the vicinity of another primary RAT access point 210, which is also sharing the communication medium 140 and providing a similar frame structure.

The illustrated frame structure includes a series of radio frames (RFs) that are numbered in accordance with a system frame number numerology (RF N, N+1, N+2, etc.) and divided into respective subframes (SFs), which may also be numbered for reference (e.g., SF0, SF1, etc.). As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6.

In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

At some point during the contention process, the communication medium 140 becomes clear (e.g., CCA Clear) and the access point 110, for example, seizes it. In order to reserve the communication medium 140 for itself for a Transmission Opportunity (TXOP) having a certain duration (e.g., one radio frame), the access point 110 may send a channel reservation message (RSV) 202 defined for the competing RAT system 150. The channel reservation message 202 may be transmitted over the communication medium 140 (e.g., via a competing-RAT-specific transceiver also belonging to the access point 110) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message 202 may include a duration indication (e.g., a Network Allocation Vector (NAV)) corresponding to the duration of the target TXOP for which the access point 110 contended for access.

In some designs, the channel reservation message 202 may be sent as a one-way communication not invoking any acknowledgement (e.g., CTS2S). In other designs, the channel reservation message 202 may be sent as a two-way handshake communication that is acknowledged by each receiving entity (e.g., CTS/RTS). In addition, the channel reservation message 202 may be sent as a deep handshake signal with a larger coverage area to reach additional, otherwise hidden nodes that may be impacted by primary RAT communication but not able to receive short-range channel reservation messages (e.g., eCTS/eRTS).

Nevertheless, the channel reservation message 202 may be limited in both its reach and effectiveness. For example, it may be defined by the competing RAT to have a relatively short range, at least in comparison with the primary RAT signaling it is intended to protect. In addition, it may be sent only once at the beginning of the TXOP, or at most a few times during the TXOP, which makes it susceptible to loss if neighboring devices are busy transmitting, receiving, or operating in a power-save mode. This may be particularly problematic for the other access point 210, which may need to temper its use of the communication medium 140 accordingly.

As is further shown in FIG. 2, to enhance the robustness of channel reservation among other primary RAT devices such as the other access point 210, the access point 110 may also transmit reservation coordination signaling 204 as part of its primary RAT signaling. The reservation coordination signaling 204 may be configured to communicate various types of reservation coordination information, such as inter-operator coordination information, reservation duration information, resource reuse information, and so on.

Figure 3:
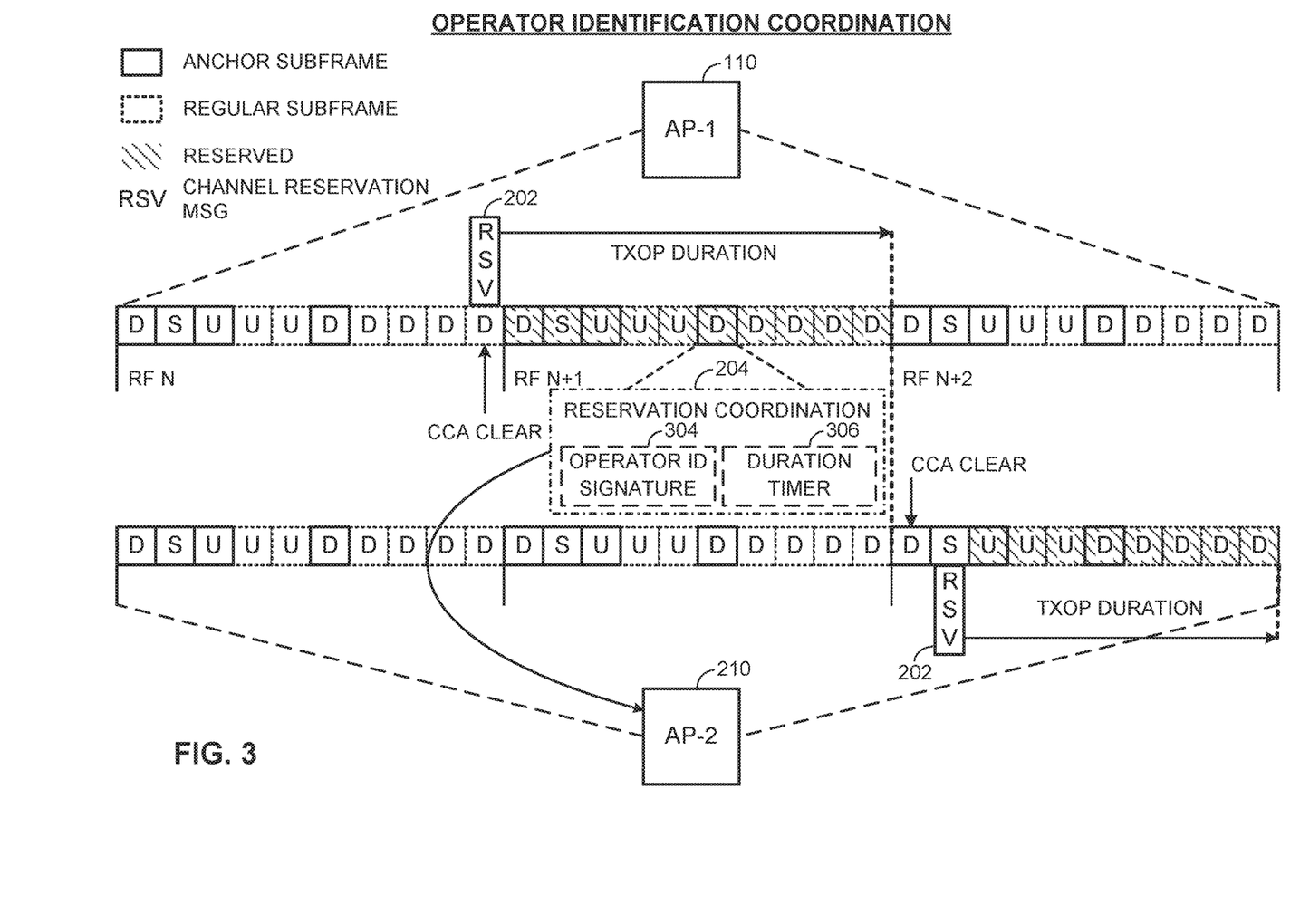
FIG. 3 illustrates an example of operator identification coordination in accordance with the virtual TDD frame structure of FIG. 2.

FIG. 3 illustrates an example of operator identification coordination in accordance with the virtual TDD frame structure of FIG. 2. In this example, the reservation coordination signaling 204 includes an operator identifier (operator ID) signature 304. It will be appreciated that such an operator ID may also be referred to as a network ID or using some other terminology that identifies a common entity to which a group of access points belong. In some scenarios, the other access point 210 may need to adapt its use of the communication medium 140 differently based on whether it is deployed by the same or a different operator as compared to the access point 110. Whereas intra-operator primary RAT operations may be protected by certain coordination mechanisms built into the primary RAT itself, this type of coordination may not be possible or feasible across operators. The operator ID signature 304 may be configured to communicate operator identification information in various ways, including direct messaging, short-term indirect detection, and long-term indirect detection.

As an example, the operator ID signature 304 may correspond to or otherwise include a broadcast message advertising the Public Land Mobile Network Identifier (PLMN ID) or the like of the operator providing or otherwise associated with the access point 110. For robustness and timeliness, this type of broadcast message may be sent in each subframe, with the one illustrated subframe being shown for illustration purposes only. For example, it may be sent in a corresponding channel defined in a control region of each subframe (e.g., the first few symbol periods) that is self-decodable and therefore accessible by both intra- and inter-operator devices.

As another example, the operator ID signature 304 may correspond to or otherwise include channel information such as a Channel State Information Reference Signal (CSI-RS) that is scrambled with the PLMN-ID. By attempting to descramble the channel information with the PLMN-ID of its own operator, the other access point 210 may be able to determine whether it is deployed by the same or a different operator as compared to the access point 110. For example, the other access point 210 may descramble CSI-RS (as scrambled by the access point 110) with the PLMN-ID of its own operator and compare the reconstructed channel state information to that provided by a similar signal such as Cell-specific Reference Signal (CRS) (unscrambled by PLMN-ID). If there is a correlation, it is likely that both access points belong to the same operator. Otherwise, the CSI-RS may descramble to noise and indicate that the access points belong to different operators. For robustness and timeliness, this type of scrambled channel information signal may be sent in each subframe, with the one illustrated subframe being shown for illustration purposes only. However, CSI-RS, for example, may be limited to the center portion of the subframe (e.g., 6 resource blocks) to reduce overhead while still providing functionality across most if not all available bandwidths. This approach may be a more efficient use of resources than certain direct messaging approaches, which may require a larger amount of overhead (e.g., 24 bits for a typical PLMN ID).

As another example, the operator ID signature 304 may correspond to or otherwise include a cell identifier (e.g., a Physical Cell Identifier (PCI)) associated with the access point 110. For example, the cell identifier may be used by the access point 110 to scramble channel information such as CRS and accordingly derived by the access point 210 by monitoring CRS. The access point 210 may over time construct and maintain a mapping of cell identifiers in use by neighboring devices and their corresponding PLMN IDs (e.g., via network listen or automatic neighbor relation operations performed during periods in which the access point 210 is not accessing the communication medium 140). This approach may be a still further efficient use of resources since it does not require additional signaling.

Returning to FIG. 3, in the illustrated example, the other access point 210 determines based on the operator ID signature 304 that it is deployed by a different operator as compared to the access point 110. It accordingly waits until the communication medium 140 becomes clear (e.g., CCA Clear) and begins contention to seize it, thereafter transmitting its own channel reservation message 202 for a corresponding TXOP duration. Otherwise, if the other access point 210 determines based on the operator ID signature 304 that it is deployed by the same operator as the access point 110, it may attempt to immediately occupy the communication medium 140 until the conclusion of the TXOP reservation of the access point 110.

As shown, the reservation coordination signaling 204 may also include a duration timer 306 to help the other access point 210 identify the conclusion of the TXOP reservation of the access point 110. For example, the duration timer 306 may include one or more bits indicating the remaining duration of the TXOP reservation of the access point 110 at any given time. For robustness and timeliness, the duration timer 306 may be sent in each subframe, with the one illustrated subframe being shown for illustration purposes only. For example, it may be sent in a corresponding channel defined in a control region of each subframe (e.g., the first few symbol periods) that is self-decodable and therefore accessible by both intra- and inter-operator devices.

In other designs, the other access point 210 may identify the conclusion of the TXOP reservation of the access point 110 by directly monitoring the communication medium 140 (e.g., using a discontinuous transmission detection procedure or the like to monitor for CRS/CSI-RS).

In still other designs, the other access point 210 may identify the conclusion of the TXOP reservation of the access point 110 by implicit coordination with the access point 110. For example, the access point 110 and the other access point 210 may be configured to reserve TXOPs in strings of downlink subframes, such that the other access point 210 may anticipate the conclusion of the TXOP reservation of the access point 110 to coincide with an uplink-to-downlink subframe transition boundary. In this way, the access point 210 may be able to more quickly begin the contention process. This approach may be better suited to scenarios in which the access points are deployed by the same operator and can more readily coordinate as well as identify which TDD configuration is being employed. In still other designs, explicit reservation duration signaling may be used.

One of the advantages of using reservation coordination signaling that includes the operator ID signature 304 is that when the access point 110 and the access point 210 are determined to belong to the same operator they may more efficiently share resources (so-called resource "reuse"). Whereas the access point 110 may employ a time division of resources with respect to the competing RAT system 150 and any inter-operator access points, it may share the reserved TXOP with one or more intra-operator access points as discussed above. However, in some scenarios, such as when the access point 110 and the access point 210 are sufficiently nearby one another that their signaling may strongly interfere, it may be advantageous for the access point 110 and the access point 210 to similarly employ a time division of resources.

Figure 4:
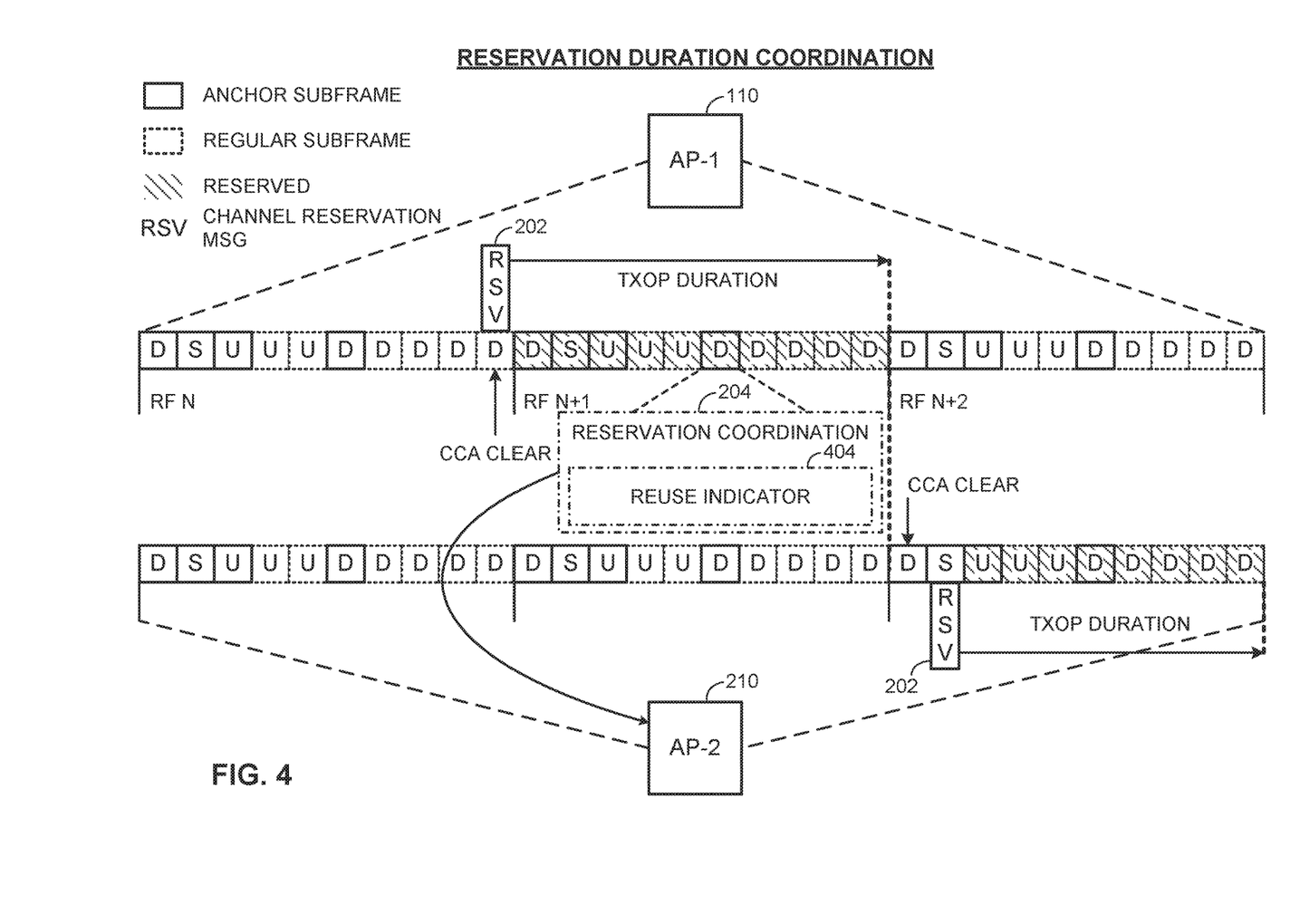
FIG. 4 illustrates an example of reuse coordination in accordance with the virtual TDD frame structure of FIG. 2.

FIG. 4 illustrates an example of reuse coordination in accordance with the virtual TDD frame structure of FIG. 2. In this example, the reservation coordination signaling 204 includes a reuse indicator 404. The reuse indicator 404 may indicate what type of resource reuse scheme is acceptable to the access point 110 for sharing or not sharing downlink or uplink subframes. As an example, the reuse indicator 404 may include one or more hard reuse bits that indicate whether intra-operator reuse is acceptable or not for a given TXOP. As another example, the reuse indicator 404 may include one or more soft reuse bits that identify conditions (e.g., a signaling energy threshold) under which intra-operator reuse is acceptable for the requested TXOP. For robustness and timeliness, the reuse indicator 404 may be sent in each subframe, with the one illustrated subframe being shown for illustration purposes only. For example, it may be sent in a corresponding channel defined in a control region of each subframe (e.g., the first few symbol periods). In some designs, the reuse indicator 404 may also or alternatively be communicated over a backhaul connection (e.g., an X2 interface) across access points belonging to the same operator.

Figure 5:
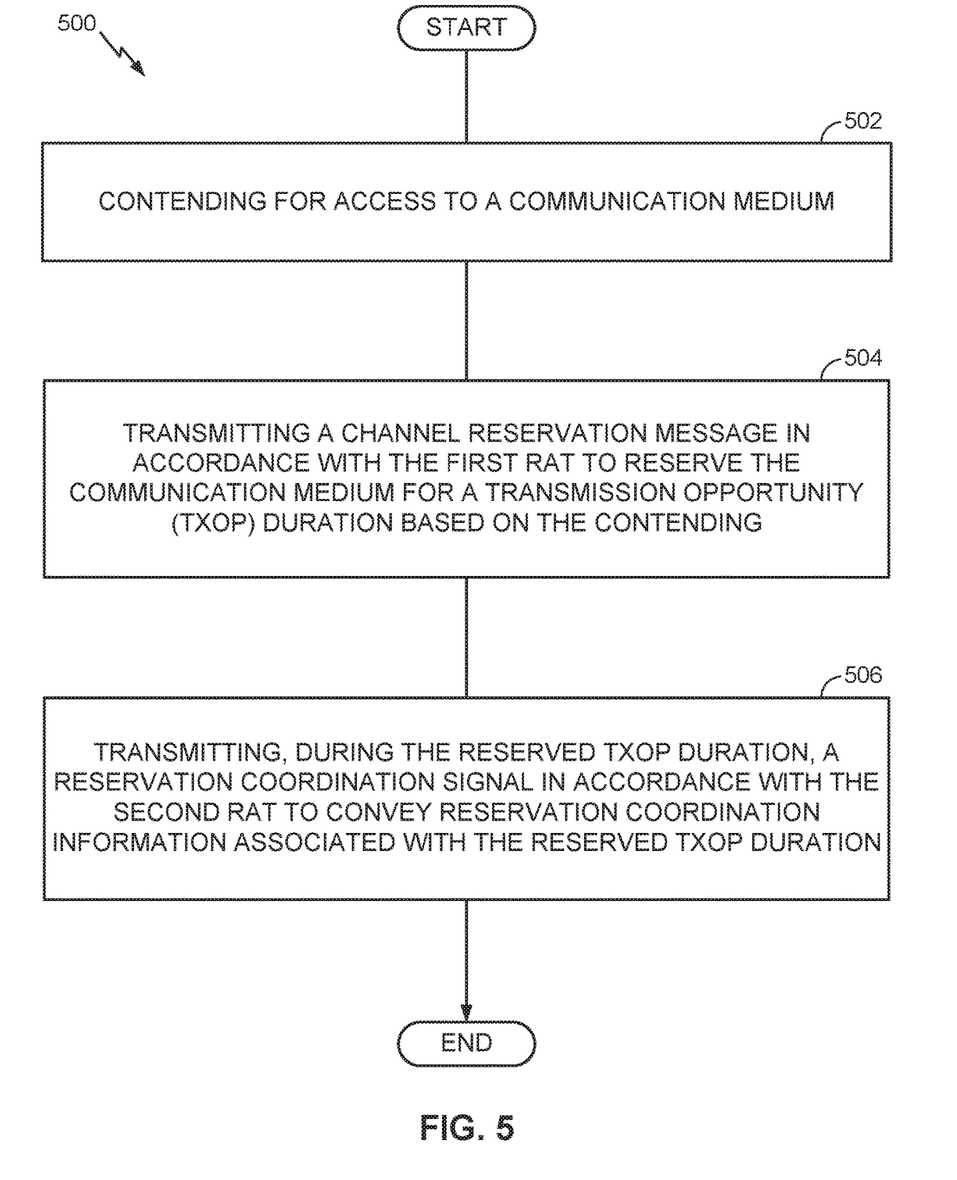
FIG. 5 is a flow diagram illustrating an example method of communication in accordance with the techniques described herein.

FIG. 5 is a flow diagram illustrating an example method of communication in accordance with the techniques described above. The method 500 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may contend for access to a communication medium (block 502) and transmit a channel reservation message in accordance with a first RAT to reserve the communication medium for a TXOP duration based on the contending (block 504). In some instances, the first RAT may correspond to the competing RAT as discussed above with respect to FIGS. 1-4, and in particular, may be a WLAN RAT such as Wi-Fi. The access point may then transmit, during the reserved TXOP duration, a reservation coordination signal in accordance with a second RAT to convey reservation coordination information associated with the reserved TXOP duration (block 506). In some instances, the second RAT may correspond to the primary RAT as discussed above with respect to FIGS. 1-4, and in particular, may be a cellular-based RAT, such as LTE.

As discussed in more detail above, the reservation coordination signal may comprise, for example, an operator identifier signature that identifies an operator associated with the reserved TXOP duration. As an example, the transmitting of the reservation coordination signal (block 506) may comprise broadcasting a PLMN ID corresponding to the operator associated with the reserved TXOP duration. As another example, the transmitting of the reservation coordination signal (block 506) may comprise broadcasting a CSI-RS that is scrambled with a PLMN ID corresponding to the operator associated with the reserved TXOP duration.

In addition or as an alternative, the reservation coordination signal may comprise, for example, a duration timer that indicates a remaining duration of the reserved TXOP duration.

In addition or as another alternative, the reservation coordination signal may comprise, for example, a reuse indicator identifying a resource reuse scheme. As an example, the reuse indicator may comprise one or more hard reuse bits that identify whether intra-operator reuse is acceptable for the reserved TXOP duration. As another example, the reuse indicator may comprise one or more soft reuse bits that identify one or more conditions under which intra-operator reuse is acceptable for the reserved TXOP duration.

As also discussed in more detail above, the reservation coordination signal may be transmitted in a control region of one or more subframes of a TDD frame structure.

For generality, the access point 110 and the access terminal 120 are shown in FIG. 1 only in relevant part as including the reservation coordination manager 112 and reservation coordination manager 122, respectively. It will be appreciated, however, that the access point 110 and the access terminal 120 may be configured in various ways to provide or otherwise support the reservation coordination techniques discussed herein. While much of the discussion above concerns reservation coordination procedures of the access point 110 and by extension the reservation coordination manager 112, it will be appreciated that the access terminal 120 and its reservation coordination manager 122 may provide similar or related functionality in some designs or scenarios, such as relaying the reservation coordination signaling from the access point 110, acting as a hotspot access point providing the reservation coordination signaling, and so on.

Figure 6:
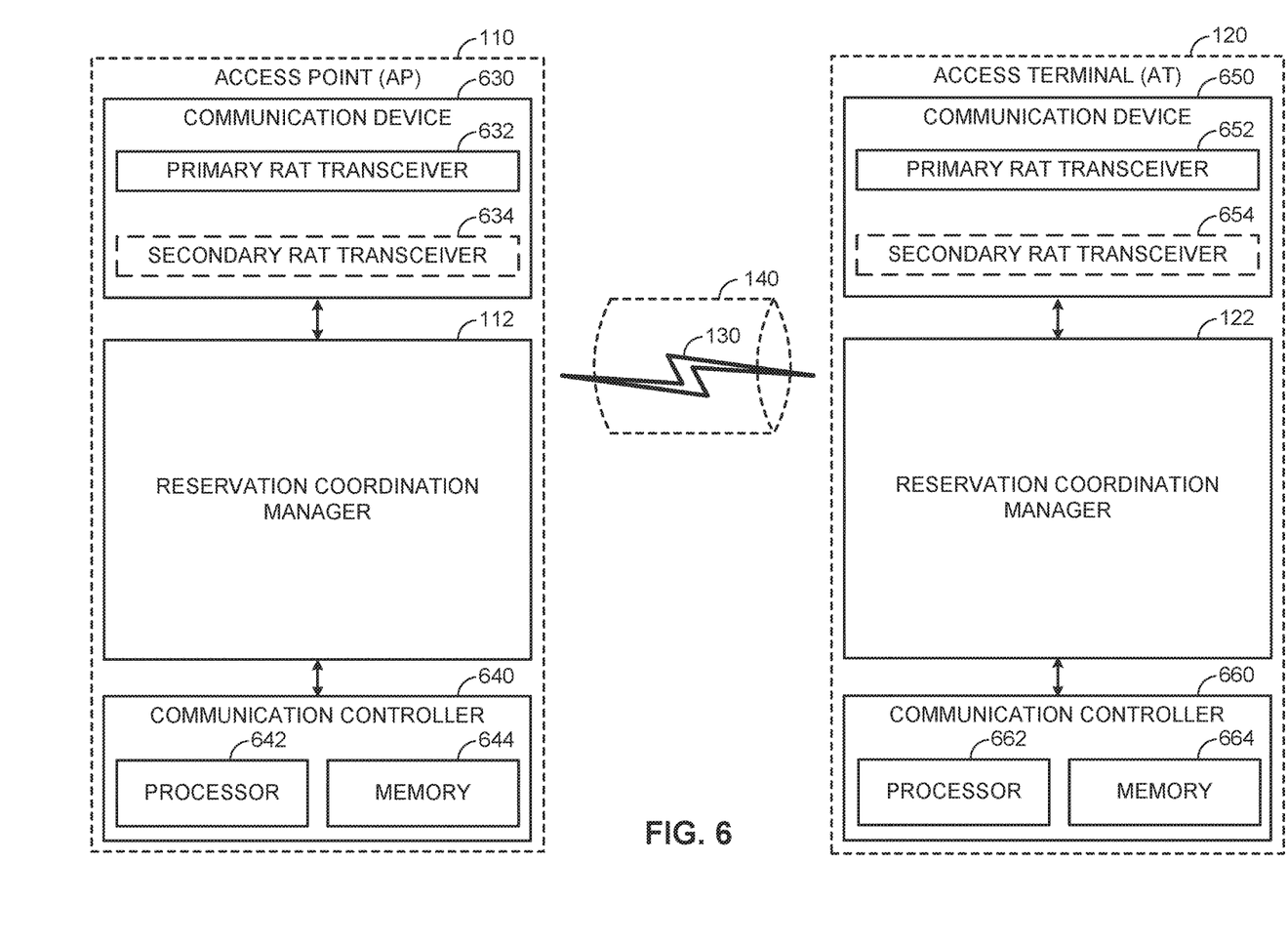
FIG. 6 is a device-level diagram illustrating example components of an access point and an access terminal in more detail.

FIG. 6 is a device-level diagram illustrating example components of the access point 110 and the access terminal 120 of the primary RAT system 100 in more detail. As shown, the access point 110 and the access terminal 120 may each generally include a wireless communication device (represented by the communication devices 630 and 650) for communicating with other wireless nodes via at least one designated RAT. The communication devices 630 and 650 may be variously configured for transmitting and encoding signals, and, conversely, for receiving and decoding signals in accordance with the designated RAT (e.g., messages, indications, information, pilots, and so on).

The communication devices 630 and 650 may include, for example, one or more transceivers, such as respective primary RAT transceivers 632 and 652, and, in some designs, (optional) co-located secondary RAT transceivers 634 and 654, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 640 and 660) for controlling operation of their respective communication devices 630 and 650 (e.g., directing, modifying, enabling, disabling, etc.). The communication controllers 640 and 660 may include one or more processors 642 and 662, and one or more memories 644 and 664 coupled to the processors 642 and 662, respectively. The memories 644 and 664 may be configured to store data, instructions, or a combination thereof, either as on-board cache memory, as separate components, a combination, etc. The processors 642 and 662 and the memories 644 and 664 may be standalone communication components or may be part of the respective host system functionality of the access point 110 and the access terminal 120.

It will be appreciated that the reservation coordination manager 112 and the reservation coordination manager 122 may be implemented in different ways. In some designs, some or all of the functionality associated therewith may be implemented by or otherwise at the direction of at least one processor (e.g., one or more of the processors 642 and/or one or more of the processors 662), at least one memory (e.g., one or more of the memories 644 and/or one or more of the memories 664), at least one transceiver (e.g., one or more of the transceivers 632 and 634 and/or one or more of the transceivers 652 and 654), or a combination thereof In other designs, some or all of the functionality associated therewith may be implemented as a series of interrelated functional modules.

Accordingly, it will be appreciated that the components in FIG. 6 may be used to perform operations described above with respect to FIGS. 1-5. In some instances, for example, the access point 110 may contend for access to the communication medium 140 via the processor 642 and the memory 644. The access point 110 may then transmit a channel reservation message via the secondary RAT transceiver 634 in order to reserve the communication medium 140 for a TXOP duration. After the communication medium 140 is reserved by the access point 110 for the TXOP duration, the access point 110 may then transmit, during the TXOP, a reservation coordination signal via the primary RAT transceiver 632 to convey reservation coordination information associated with the reserved TXOP duration. In some instances, the reservation coordination signal may include an operator identifier signature (e.g., a broadcasted PLMN ID), a duration timer indicating remaining duration of the TXOP, or a reuse indicator identifying a resource reuse scheme. In some examples, the reservation coordination signal may be transmitted in a control region of one or more subframes of a TDD frame structure.

Figure 7:
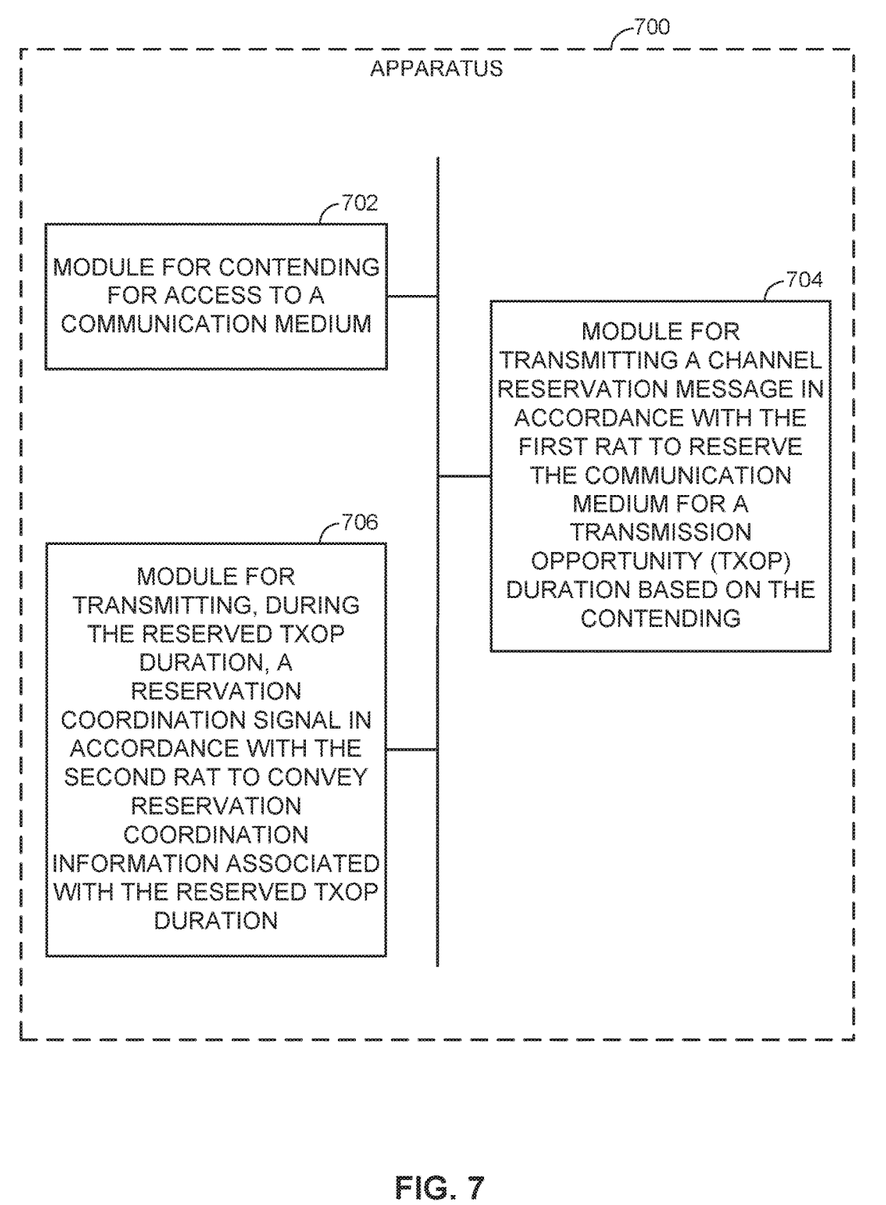
FIG. 7 illustrates an example apparatus represented as a series of interrelated functional modules.

FIG. 7 illustrates an example access point apparatus for implementing the reservation coordination manager 112 represented as a series of interrelated functional modules. In the illustrated example, the apparatus 700 includes a module for contending 702, a module for transmitting 704, and a module for transmitting 706.

The module for contending 702 may be configured to contend for access to a communication medium. The module for transmitting 704 may be configured to transmit a channel reservation message in accordance with a first RAT to reserve the communication medium for a TXOP duration based on the contending. The module for transmitting 706 may be configured to transmit, during the reserved TXOP duration, a reservation coordination signal in accordance with a second RAT to convey reservation coordination information associated with the reserved TXOP duration.

As discussed in more detail above, the reservation coordination signal may comprise, for example, an operator identifier signature that identifies an operator associated with the reserved TXOP duration. As an example, the transmitting of the reservation coordination signal may comprise broadcasting a PLMN ID corresponding to the operator associated with the reserved TXOP duration. As another example, the transmitting of the reservation coordination signal may comprise broadcasting a CSI-RS that is scrambled with a PLMN ID corresponding to the operator associated with the reserved TXOP duration.

In addition or as an alternative, the reservation coordination signal may comprise, for example, a duration timer that indicates a remaining duration of the reserved TXOP duration.

In addition or as another alternative, the reservation coordination signal may comprise, for example, a reuse indicator identifying a resource reuse scheme. As an example, the reuse indicator may comprise one or more hard reuse bits that identify whether intra-operator reuse is acceptable for the reserved TXOP duration. As another example, the reuse indicator may comprise one or more soft reuse bits that identify one or more conditions under which intra-operator reuse is acceptable for the reserved TXOP duration.

As also discussed in more detail above, the reservation coordination signal may be transmitted in a control region of one or more subframes of a TDD frame structure.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 7 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A wireless communication method, comprising:
   contending for access to a shared wireless communication medium;
   transmitting, on the shared wireless communication medium, a channel reservation message in accordance with a first Radio Access Technology (RAT) to reserve the shared wireless communication medium for a transmission opportunity (TXOP) duration based on the contending; and
   transmitting, on the shared wireless communication medium, during the reserved TXOP duration, a reservation coordination signal in accordance with a second RAT to convey reservation coordination information associated with the reserved TXOP duration.

2. The method of claim 1, wherein the reservation coordination signal comprises an operator identifier signature that identifies an operator associated with the reserved TXOP duration.

3. The method of claim 2, wherein the transmitting of the reservation coordination signal comprises broadcasting a Public Land Mobile Network Identifier (PLMN ID) corresponding to the operator associated with the reserved TXOP duration.

4. The method of claim 2, wherein the transmitting of the reservation coordination signal comprises broadcasting a Channel State Information Reference Signal (CSI-RS) that is scrambled with a Public Land Mobile Network Identifier (PLMN ID) corresponding to the operator associated with the reserved TXOP duration.

5. The method of claim 1, wherein the reservation coordination signal comprises a duration timer that indicates a remaining duration of the reserved TXOP duration.

6. The method of claim 1, wherein the reservation coordination signal comprises a reuse indicator identifying a resource reuse scheme.

7. The method of claim 6, wherein the reuse indicator comprises one or more hard reuse bits that identify whether intra-operator reuse is acceptable for the reserved TXOP duration.

8. The method of claim 6, wherein the reuse indicator comprises one or more soft reuse bits that identify one or more conditions under which intra-operator reuse is acceptable for the reserved TXOP duration.

9. The method of claim 1, wherein the reservation coordination signal is transmitted in a control region of one or more subframes of a Time Division Duplexing (TDD) frame structure.

10. The method of claim 1, wherein:
    the first RAT comprises Wi-Fi technology; and
    the second RAT comprises Long Term Evolution (LTE) technology.

11. An apparatus for wireless communication, comprising:
    at least one processor;
    at least one memory coupled to the at least one processor, the at least one processor and the at least one memory being configured to contend for access to a shared wireless communication medium; and
    at least one transceiver configured to:
       transmit, on the shared wireless communication medium, a channel reservation message in accordance with a first Radio Access Technology (RAT) to reserve the shared wireless communication medium for a transmission opportunity (TXOP) duration based on the contending, and transmit, on the shared wireless communication medium, during the reserved TXOP duration, a reservation coordination signal in accordance with a second RAT to convey reservation coordination information associated with the reserved TXOP duration.

12. The apparatus of claim 11, wherein the reservation coordination signal comprises an operator identifier signature that identifies an operator associated with the reserved TXOP duration.

13. The apparatus of claim 12, wherein the at least one transceiver is configured to transmit the reservation coordination signal by broadcasting a Public Land Mobile Network Identifier (PLMN ID) corresponding to the operator associated with the reserved TXOP duration.

14. The apparatus of claim 12, wherein the at least one transceiver is configured to transmit the reservation coordination signal by broadcasting a Channel State Information Reference Signal (CSI-RS) that is scrambled with a Public Land Mobile Network Identifier (PLMN ID) corresponding to the operator associated with the reserved TXOP duration.

15. The apparatus of claim 11, wherein the reservation coordination signal comprises a duration timer that indicates a remaining duration of the reserved TXOP duration.

16. The apparatus of claim 11, wherein the reservation coordination signal comprises a reuse indicator identifying a resource reuse scheme.

17. The apparatus of claim 16, wherein the reuse indicator comprises one or more hard reuse bits that identify whether intra-operator reuse is acceptable for the reserved TXOP duration.

18. The apparatus of claim 16, wherein the reuse indicator comprises one or more soft reuse bits that identify one or more conditions under which intra-operator reuse is acceptable for the reserved TXOP duration.

19. The apparatus of claim 11, wherein the at least one transceiver is configured to transmit the reservation coordination signal in a control region of one or more subframes of a Time Division Duplexing (TDD) frame structure.

20. The apparatus of claim 11, wherein:
the first RAT comprises Wi-Fi technology; and
the second RAT comprises Long Term Evolution (LTE) technology.

21. An apparatus for wireless communication, comprising:
means for contending for access to a shared wireless communication medium;
means for transmitting, on the shared wireless communication medium, a channel reservation message in accordance with a first Radio Access Technology (RAT) to reserve the shared wireless communication medium for a transmission opportunity (TXOP) duration based on the contending; and
means for transmitting, on the shared wireless communication medium, during the reserved TXOP duration, a reservation coordination signal in accordance with a second RAT to convey reservation coordination information associated with the reserved TXOP duration.

22. The apparatus of claim 21, wherein the reservation coordination signal comprises an operator identifier signature that identifies an operator associated with the reserved TXOP duration.

23. The apparatus of claim 22, wherein the means for transmitting the reservation coordination signal comprises:
means for broadcasting a Public Land Mobile Network Identifier (PLMN ID) corresponding to the operator associated with the reserved TXOP duration, or
means for broadcasting a Channel State Information Reference Signal (CSI-RS) that is scrambled with a PLMN ID corresponding to the operator associated with the reserved TXOP duration.

24. The apparatus of claim 21, wherein the reservation coordination signal comprises a duration timer that indicates a remaining duration of the reserved TXOP duration.

25. The apparatus of claim 21, wherein the reservation coordination signal comprises a reuse indicator identifying a resource reuse scheme.

26. A non-transitory computer-readable medium comprising code, which, when executed by a processor, causes the processor to perform operations for wireless communication, the non-transitory computer-readable medium comprising:
code for contending for access to a shared wireless communication medium;
code for transmitting, on the shared wireless communication medium, a channel reservation message in accordance with a first Radio Access Technology (RAT) to reserve the shared wireless communication medium for a transmission opportunity (TXOP) duration based on the contending; and
code for transmitting, on the shared wireless communication medium, during the reserved TXOP duration, a reservation coordination signal in accordance with a second RAT to convey reservation coordination information associated with the reserved TXOP duration.

27. The non-transitory computer-readable medium of claim 26, wherein the reservation coordination signal comprises an operator identifier signature that identifies an operator associated with the reserved TXOP duration.

28. The non-transitory computer-readable medium of claim 27, wherein the code for transmitting the reservation coordination signal comprises:
code for broadcasting a Public Land Mobile Network Identifier (PLMN ID) corresponding to the operator associated with the reserved TXOP duration, or
code for broadcasting a Channel State Information Reference Signal (CSI-RS) that is scrambled with a PLMN ID corresponding to the operator associated with the reserved TXOP duration.

29. The non-transitory computer-readable medium of claim 26, wherein the reservation coordination signal comprises a duration timer that indicates a remaining duration of the reserved TXOP duration.

30. The non-transitory computer-readable medium of claim 26, wherein the reservation coordination signal comprises a reuse indicator identifying a resource reuse scheme.

* * * * *